March 27, 1962  F. G. REUTER  3,027,182

JOINTS

Filed Feb. 18, 1957

INVENTOR:
Franz Gottfried Reuter
By Clelle W. Upchurch
ATTORNEY.

3,027,182
JOINTS
Franz Gottfried Reuter, Lemforde, Hannover, Germany, assignor, by mesne assignments, to Mobay Chemical Company, Pittsburgh, Pa., a corporation of Delaware
Filed Feb. 18, 1957, Ser. No. 640,979
Claims priority, application Germany Feb. 22, 1956
1 Claim. (Cl. 287—87)

This invention relates to a new joint and more particularly to a joint of the ball-and-socket type suitable for use in steering mechanisms for motor vehicles and the like.

Ball-and-socket joints are usually made up of a housing, the ball end of an arm movable in the housing and bushings forming the bearing surface for the ball end. In many joints, the bushings are pressed against the ball end by a spring.

The conventional ball-and-socket joints can serve many useful purposes but suffer from the disadvantage of requiring frequent servicing to prevent dust and dirt from entering the space between the bearing surface and the ball end. If dirt particles should find a way into this space, they considerably hasten the wear of the moving parts, which, of course, is most undesirable.

It is, therefore, a primary object of the present invention to provide a ball-and-socket joint which does not allow any dust or dirt to penetrate into its interior. Another object of the invention is to provide a ball-and-socket joint which does not require frequent lubrication. A further object of the invention is to provide a ball-and-socket joint which stands up even under heavy conditions of operation and has a long service life. Still further objects will appear hereinafter.

With the above and other objects in view, the invention provides a ball-and-socket joint wherein the open side of the housing which receives the movable arm is sealed by a highly elastic collar or gasket of a plastic material which fits with its edges dust-tight against the housing and the arm and which forms an annular bag around the latter. Consisting of a chemically-resistant plastic material, the collar is more efficient than a rubber gasket in sealing the joint against dust and dirt since it does not deteriorate during its use. Particular advantages are obtained if the collar is made of a rubber-like polyurethane plastic. Such rubber-like polyurethanes are highly elastic and chemically resistant; they do not shrink and do not become porous or hard as a result of aging or chemical attack.

As stated above, the collar forms an annular bag around the movable arm of the joint. This annular bag serves as a grease container and is filled with a grease not affecting the plastic material forming the collar.

Specific embodiments of the invention are illustrated in the accompanying drawing in which FIGURE 1 is a vertical, sectional view of one embodiment of the invention;

Figure 1:
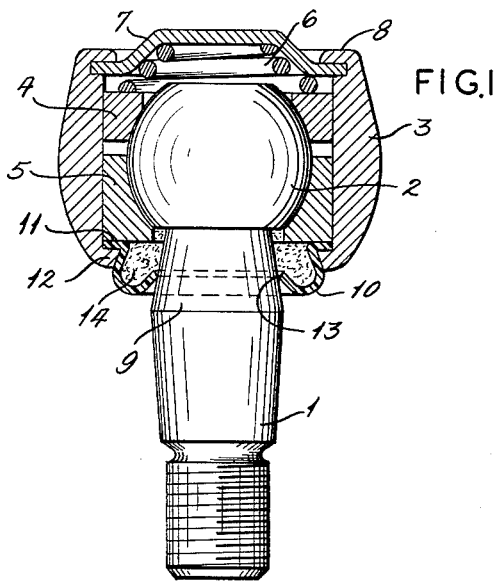

Referring more particularly to the drawings, the joint illustrated in FIGURE 1 is composed of the movable arm 1 having the ball end 2, the housing 3, the upper bushing 4 and the lower bushing 5. Spring 6, inserted between plate 7 and upper bushing 4, presses the bushings against the ball end 2 and thus insures a tight fit. Plate 7 is held in position by flange 8. Collar 10 made of highly elastic and chemically-resistant polyurethane seals the interior of the joint against dust and dirt. The outer lip 11 of the collar 10 is secured between the bushing 5 and the flange 12 while the inner lip 13 lies firmly against the tapered portion 9 of the arm 1. The annular bag 14 formed by the collar 10 is filled with a permanent grease to reduce wear and tear.

Figure 2:
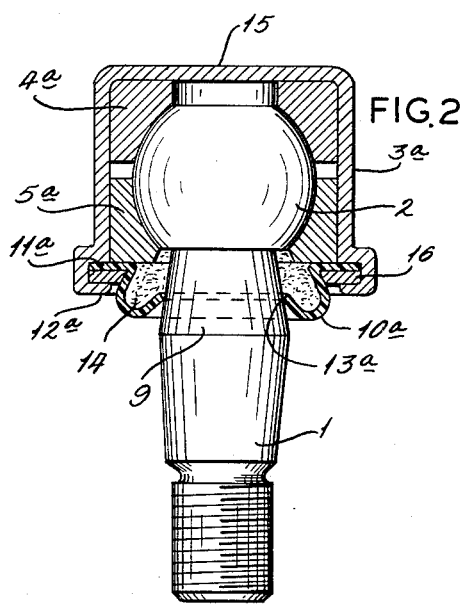
FIGURE 2 is a vertical, sectional view of another embodiment of the invention.

The embodiment shown in FIGURE 2 comprises the arm 1 with tapered portion 9 and ball end 2, and the housing 3a containing the bushings 4a and 5a. The bottom 15 is a part of the housing 3a, both being stamped from the same sheet. Between the outer lip 11a of the elastic polyurethane collar 10a and the flange 12a, there is inserted a special clamping ring 16 which, with its entire width, grasps the lip 11a of the collar 10a held by the bushing 5a. The inner lip 13a of the collar 10a lies firmly against the tapered portion 9 of the arm 1. The annular bag 14 of the collar 10a is filled with grease.

Figure 3:
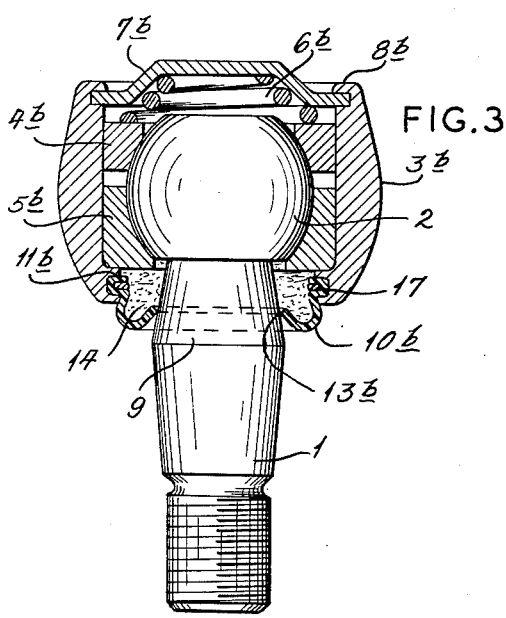
FIGURE 3 is a vertical, sectional view of a third embodiment of the invention.

In the embodiment shown in FIGURE 3, arm 1, its tapered portion 9, ball end 2, housing 3b, plate 7b and flange 8b are shaped and arranged like the corresponding elements of the joint illustrated in FIGURE 1. However, the lower bushing 5b rests on a protuberance of the housing. This protuberance forms a groove which holds the clamping ring 17 and the thickened outer lip 11b of the elastic polyurethane collar 10b. The inner lip 13b of collar 10b fits firmly against the tapered portion 9 of arm 1. The annular space 14, defined by collar 10b, is filled with grease.

Any suitable rubber-like polyurethanes may be used as the construction material for the collar element of the joints of the instant invention including polyurethanes made by reacting a substantially linear hydroxyl polyester with excess diisocyanate and cross-linking the isocyanate-modified polyester thus obtained with water, a glycol or a diamine. In order to impart a high degree of smoothness to the bushings of the composite bearings in accordance with this invention, it is preferred to add to the reactive mixture of hydroxyl polyester and diisocyanate, a small amount of a surface-active agent, such as an alkali salt of a fatty acid, a higher alkl sulfonate or an alkyl aryl sulfate. Those rubber-like polyurethane plastics are preferred for the process of the present invention the permanent elongation of which does not exceed 3%. The elastic rebound should be at least 60%. The optimum of the hardness is within the range from about 60—about 70° Shore. If desired, it is of course possible for these mechanical properties to deviate more or less from the above limits. The production of suitable rubber-like polyurethanes is described in detail in the literature, such as in U.S. Patents 2,620,516; 2,621,166; 2,729,618 and elsewhere.

*Example*

A polyester is prepared from 1 mol of adipic acid and 1.1 mol of ethylene glycol by thermal condensation at a temperature of 200–220° C., the polyester having an OH number of 50 and an acid number of about 1. To this polyester are given 0.01% of the sodium salt of diisobutylnaphtalene sulfonic acid. 1000 g. of the polyester thus prepared are mixed with 180 g. of naphthalene-1.5-diisocyanate. The reaction mixture is stirred at a temperature of 125° C. for about 15 minutes. To this reaction mixture 20 g. of 1.4-butylene glycol are added. After thoroughly mixing the liquid is poured into a mold and held at a temperature of 120° C. for about half an hour. The molding thus obtained is stored for 24 hours at a temperature of 110° C.

Although the invention is described in detail in the foregoing, modifications can be made by those skilled in the art without departing from the spirit or scope of the invention except as set forth in the claim.

What is claimed is:

A ball and socket joint comprising a housing, said housing having a cylindrical inner wall surface with upper and lower inwardly extending flanges substantially perpendicular to said wall surface at the ends thereof, a movable arm having a spherical ball end disposed within said cylindrical wall surface of said housing, an upper annular bushing and a lower annular bushing positioned between said wall surface and said spherical ball end, resilient means for pressing said upper bushing down on said spherical ball which in turn presses said spherical ball against said lower annular bushing, said resilient means disposed within said housing and contained therein by a plate element secured in position by said upper flange, a resilient annular collar having an aperture through the center thereof and a lip around the periphery thereof, said annular collar disposed about said movable arm and having said lip tightly positioned, due to the action of said resilient means, between said lower annular bushing and said lower flange of said housing thereby forming an annular bag between said movable arm and said lower flange of said housing, to effectively seal said joint against dust, a supply of lubricant disposed within said collar, said collar being a polyurethane rubber having a permanent elongation of not more than 3 percent, an elastic rebound of at least about 60 percent and a Shore A hardness of from about 60° to 70°.

References Cited in the file of this patent

UNITED STATES PATENTS

| | | |
|---|---|---|
| 830,203 | Bogart | Sept. 4, 1906 |
| 2,197,889 | Katcher | Apr. 23, 1940 |
| 2,305,265 | Le Tauneau | Dec. 15, 1942 |
| 2,397,464 | Booth | Apr. 2, 1946 |
| 2,507,087 | Booth | May 9, 1950 |
| 2,617,279 | Miller | Nov. 11, 1952 |
| 2,733,087 | Latzen | Jan. 31, 1956 |
| 2,752,178 | Hoffman | June 26, 1956 |

FOREIGN PATENTS

| | | |
|---|---|---|
| 1,091,445 | France | Apr. 12, 1955 |